(12) United States Patent
Chijiiwa et al.

(10) Patent No.: US 9,424,551 B2
(45) Date of Patent: *Aug. 23, 2016

(54) SECURE INTER-MODULE COMMUNICATION MECHANISM

(75) Inventors: Ryo Chijiiwa, Cerritos, CA (US); Isaac Alfred Henry Wasileski, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1243 days.

This patent is subject to a terminal disclaimer.

(21) Appl. No.: 13/361,721

(22) Filed: Jan. 30, 2012

(65) Prior Publication Data
US 2012/0131448 A1 May 24, 2012

Related U.S. Application Data

(63) Continuation of application No. 12/207,430, filed on Sep. 9, 2008, now Pat. No. 8,108,771, which is a continuation of application No. 11/845,538, filed on Aug. 27, 2007, now Pat. No. 8,108,770.

(51) Int. Cl.
*G06F 17/00* (2006.01)
*G06Q 10/10* (2012.01)

(52) U.S. Cl.
CPC ..................................... *G06Q 10/10* (2013.01)

(58) Field of Classification Search
CPC .............................. G06F 17/24; G06Q 10/10
USPC .................. 715/240, 234, 277; 717/115, 116
See application file for complete search history.

(56) References Cited

U.S. PATENT DOCUMENTS 7,685,631 B1 * 3/2010 Paya et al. ...................... 726/8
2007/0299857 A1 * 12/2007 Gwozdz ............ G06F 17/30899

* cited by examiner

*Primary Examiner* — Stephen Hong
*Assistant Examiner* — Matthew Ludwig
(74) *Attorney, Agent, or Firm* — Greenberg Traurig LLP; James J. DeCarlo

(57) ABSTRACT

Methods, apparatuses, and systems directed to facilitating secure, structured interactions between code modules executing within the context of a document processed by a user agent, such as a browser client, that implements a domain security model. In a particular implementation, a module connector script or object loaded into a base document discovers listener modules and sender modules corresponding to different origins or domains, and passes information between them. In this manner, a listener module may consume and use information from a sender module located on the same page simply by having an end-user add both modules to a web page without having to explicitly define any form of interconnection. For example, a photo module may access a user account at a remote photo sharing site, and provide one or more photos to a module that renders the photographs in a slide show.

16 Claims, 8 Drawing Sheets

```
<html>
  <head>
    <title>Yahoo! Web Page</title>
  </head>

<body>   402
    <iframe id=module_A src="http://modulehost1.com/path/module_A?token=iFtokenA"
     height="100" width="200" frameborder="1" scrolling="no">
    </iframe>   404

<iframe id=module_B src="http://modulehost2.com/path/module_B?token=iFtokenB"
     height="100" width="200" frameborder="1" scrolling="no">
    </iframe>              406

<script src="conduit.js">     408

{token to moduleId mapping}
            iFtokenA = Module_A;
            iFtokenB = Module_B;

</script>

</body>
</html>
```

Fig. 4

```
<html>
  <head>          502
    <script src="messenger.js?token=iFtokenA"></script>
  </head>

<body>
    <h1> Flickr </h1>

<div>

[PHOTOS HERE]

</div>

<script>
        loadPhotosFromFlickr();

advertisePhotos();
                   504
            send({channel:"pictures"; data: [................]});

</script>

</body>
</html>
```

Fig. 5

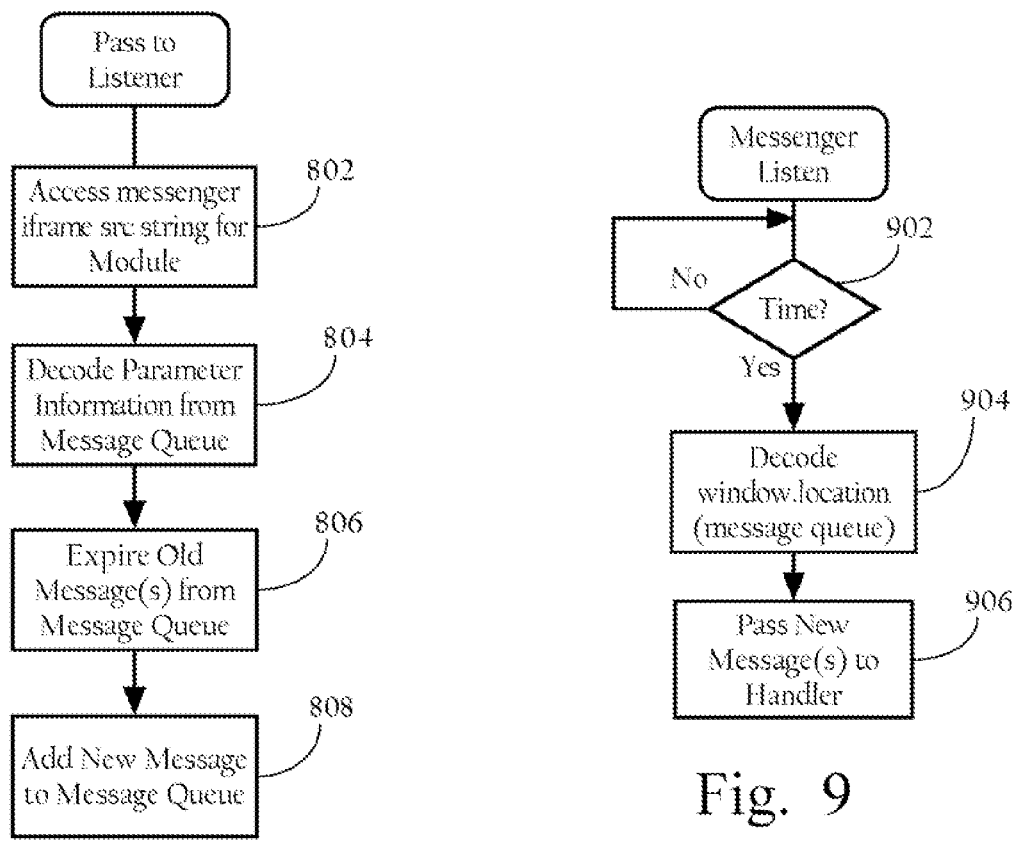

SECURE INTER-MODULE COMMUNICATION MECHANISM

CROSS-REFERENCE TO RELATED APPLICATION

This application is a continuation of U.S. Non-Provisional application Ser. No. 12/207,430 filed on Sep. 9, 2008, now U.S. Pat. No. 8,108,771 entitled "Secure Inter-Module Communication Mechanism," which is a continuation of U.S. Non-Provisional application Ser. No. 11/845,538 filed on Aug. 27, 2007, now U.S. Pat. No. 8,108,770 entitled "Secure Inter-Module Communication Mechanism," each of the non-provisional applications being incorporated herein by reference.

TECHNICAL FIELD

The present disclosure generally relates to communication between code objects executable within the context of a web page or other structured document processed by a browser or other client application.

BACKGROUND

Interactive systems connected by wide area networks such as the Internet have steadily evolved into vibrant mediums for information exchange, social interaction and sharing of digital media. Internet users typically maintain one or more accounts with various service providers that feature customizable personal pages, such as personal home pages (e.g., my.yahoo.com, etc.), personal pages on social network sites (e.g., facebook.com, myspace.com, etc.), and the like. To enhance the utility and customization of such pages to end users, service providers sometimes allow users to customize their pages with one or more functional modules or widgets (hereinafter referred to as modules).

In web or Internet environments, these modules can include HTML code and scripts (such as JavaScript, and Asynchronous JavaScript and XML (AJAX)) that execute within the context of a client application, such as a browser, to achieve a variety of useful or entertaining functions. For example, modules can be developed to display content, such as blog entries, news headlines or podcasts, obtained from Really Simple Syndication (RSS) feeds. Other modules can be developed to display a slideshow of photos hosted on a content aggregation site, such as flickr.com. Other modules can display real-time stock quotes. In many instances, the modules appear in a base HTML document as frames or Inline Frames (iframes), which makes it possible to embed another HTML document inside the base HTML document.

The service providers maintaining these customizable pages may develop a number of modules from which users may select and add to their pages. Given the wide variety of functions that modules can perform and the seemingly unlimited creativity of users, however, some service providers also provide an open development environment that allows third parties to develop modules, as well. Given the security issues involved in allowing third party modules, however, service providers also typically rely on certain measures to minimize the security concerns regarding third-party modules. Specifically, content in different windows and frames of a web page can interact in powerful ways by scripting with the document object model. However, since a browser client can simultaneously display unrelated content, such as a base page and one or more modules, in its various windows and frames, certain policies must be applied to protect data integrity and privacy of information. If no security measures are taken, a module executing in one frame might be able to learn information in other modules or the base document. To allow unfettered access in this manner could be a breach of the user's privacy.

Accordingly, most publicly available browser clients (such as Mozilla® Firefox, and Microsoft® Internet Explorer®) support a domain security model that only allows interactions with content from the same origin. For example, an object of an iframe corresponding to one domain (e.g., http://yahoo.com/) may not access the content of another frame or the base document, if the content is sourced from another domain (e.g., https://example.com/). As to Javascript, for instance, to prevent cross-site security problems, browsers enforce the same origin policy in the javascript object model. That is, scripts running in one iframe may not access any objects inside another iframe, unless both pages in the iframes come from the same origin. Some browsers consider two pages to have the same origin if the protocol, port (if given), and host are the same for both pages. Without domain security, a rogue page could snoop on another page, access cookies outside its domain, or manipulate content using Dynamic HyperText Markup Language (DHTML).

Service providers may take advantage of the domain security model supported by standard browsers in connection with third party modules. For example, a service provider may serve HTML documents, including a third party module or references (e.g., src attribute) to the third party module, in iframes corresponding to a different origin or domain from the base document, as well as documents embedded in other iframes. In this manner, operation of a given third party module is effectively contained within the context of its corresponding iframe.

SUMMARY

The present invention provides methods, apparatuses, and systems directed to facilitating secure, structured interactions between code modules executing within the context of a document processed by a user agent, such as a browser client, that implements a domain security model. In a particular implementation, a module connector script or object loaded into a base document discovers listener modules and sender modules corresponding to different origins or domains, and passes information between them. In this manner, a listener module may consume and use information from a sender module located on the same page simply by having an end-user add both modules to a web page without having to explicitly define any form of interconnection. For example, a photo module may access a user account at a remote photo sharing site, and provide one or more photos to a module that renders the photographs in a slide show.

DESCRIPTION OF THE DRAWINGS

FIG. 4 is example code illustrating elements of a HTML document corresponding to a base web page or document.

FIG. 5 is example code illustrating elements of a HTML document corresponding to a module.

FIGS. 6 thru 9 are flow charts illustrating inter-module communication processes according to a particular implementation of the invention.

DESCRIPTION OF EXAMPLE EMBODIMENT(S)

A. Example Network System Architecture

Figure 1:
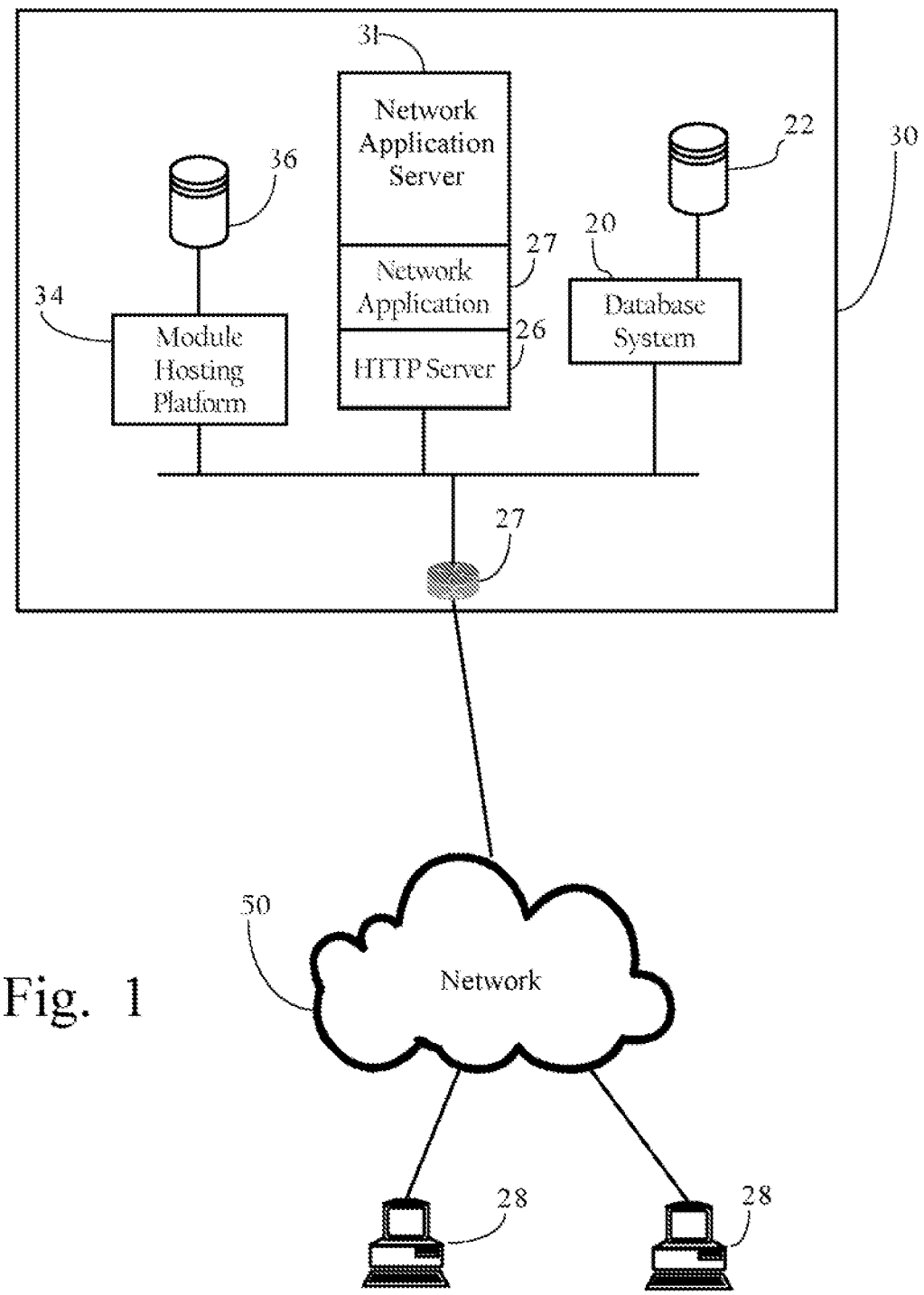
FIG. 1 is a schematic diagram illustrating a network environment in which particular implementations of the invention may operate.

FIG. 1 illustrates an example network environment in which particular implementations may operate. As FIG. 1 illustrates, particular implementations of the invention may operate in a network environment comprising service provider site 30 and one or more client systems 28. Service provider site 30 comprises a network application server 31 hosting HyperText Transfer Protocol (HTTP) server 26 and network application 27, a database system 20 that is operatively coupled to a database 22, and module hosting platform 34 operatively coupled to a data store 36 of module information. Router 27 operatively couples service provider site 30 to network cloud 24. Network cloud 24 generally represents one or more interconnected networks, over which the systems and hosts described herein can communicate. Network cloud 24 may include packet-based wide area networks (such as the Internet), private networks, wireless networks, satellite networks, cellular networks, paging networks, and the like.

Database system 20 is a network addressable system that may host a database application and may operate in conjunction with a variety of network applications, such as a social network system, a customizable user home page (e.g., my.yahoo.com), etc. Database system 20 is accessible to one or more hosts over a computer network. In one implementation, database 22 may store various types of information such as user account information, user profile data, addresses, preferences, financial account information. Database 22 may also store content such as digital content data objects and other media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, database 22 connotes a large class of data storage and management systems. In particular implementations, database 22 may be implemented by any suitable physical system including components, such as database servers, mass storage media, media library systems, and the like. Module hosting platform 34 hosts modules developed internally by service provider site 30, as well as modules developed by third parties. Data store 36 stores module definition data, such as computer program code, HTML code, scripts, Adobe® Flash® (swf) objects, and the like.

In a particular implementation, a network application 27 may access database system 20 to retrieve, add or modify data stored therein as required to provide a network application, such as a social network application or customizable home page, to one or more users. In response to a request for a home page from a given user, network application server 27 may access database system 20 to a retrieve page format and layout information from a corresponding user account. The layout information may identify, among other things, modules that the user has added to his or her page. Network application 27 may then access module hosting platform 34 in order to obtain or generate HTML code and other content for adding the modules identified in the layout information. Network application 27 may then merge this content into a base document or page template and transmit the merged page to the user.

Client systems 28 are operably connected to the network environment via a network service provider or any other suitable means. Client systems 28 may include personal computers or mobile devices, such as lap top computers, personal digital assistants (PDAs), etc. Clients systems 28 may include one or more processors, a memory, a network interface, one or more input/output (I/O) devices and a system bus interconnecting these components. Client systems 28 may also include an operating system and a user agent, such as a browser client, operative to interact with service provider site 30. Browser clients may include Microsoft® Internet Explorer®, Mozilla Firefox®, Apple® Safari®, Netscape® Navigator®, and any other suitable user agent. Such browser clients support a domain security model that disallows interaction between content (e.g., code objects and scripts) served from different origins. In a particular implementation, an origin is defined as a combination of a host name, port, and protocol. A host name could be an IP address or a domain name. A port refers to a Transport Control Protocol/Internet Protocol (TCP/IP) port, while protocol refers to protocol layers above the transport layer, such as HTTP, S-HTTP, HTTP over Secure Sockets Layer (HTTPS). Still further, some browsers consider an IP address (e.g., 66.213.145.93) and a domain name that resolves to that IP address to be different origins when used in connection with iframes.

A.1. Example Server System Architecture

The server host systems described herein (such as network application server 31) may be implemented in a wide array of computing systems and architectures. Still further, the system architecture for client systems 28 may be quite similar to server system architectures. For example, the system architecture may further include I/O systems, such as a mouse, keyboard, and a display device. The following describes example computing architectures for didactic, rather than limiting, purposes.

Figure 2:
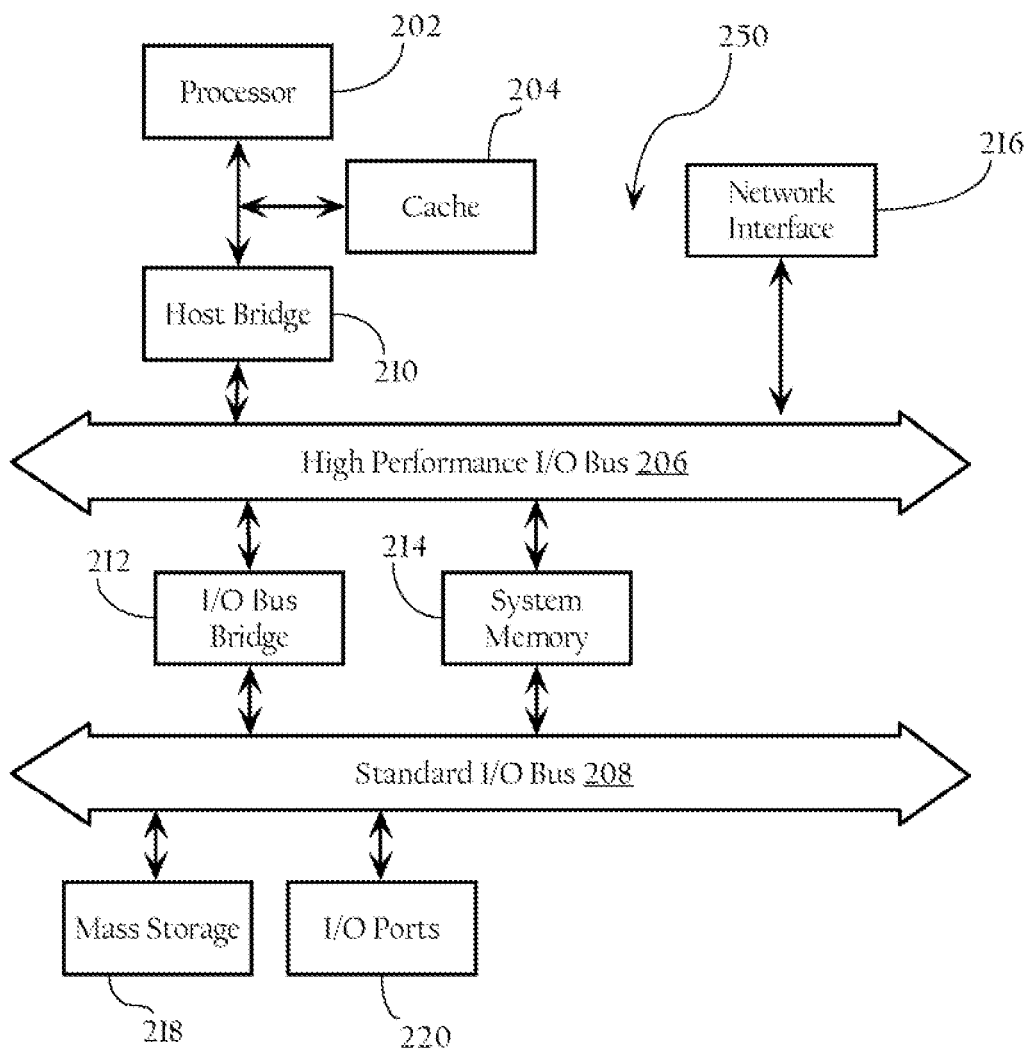
FIG. 2 illustrates an example computing system architecture, which may be used to implement a physical server.

FIG. 2 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

B. Inter-Module Communication Functions

Figure 3:
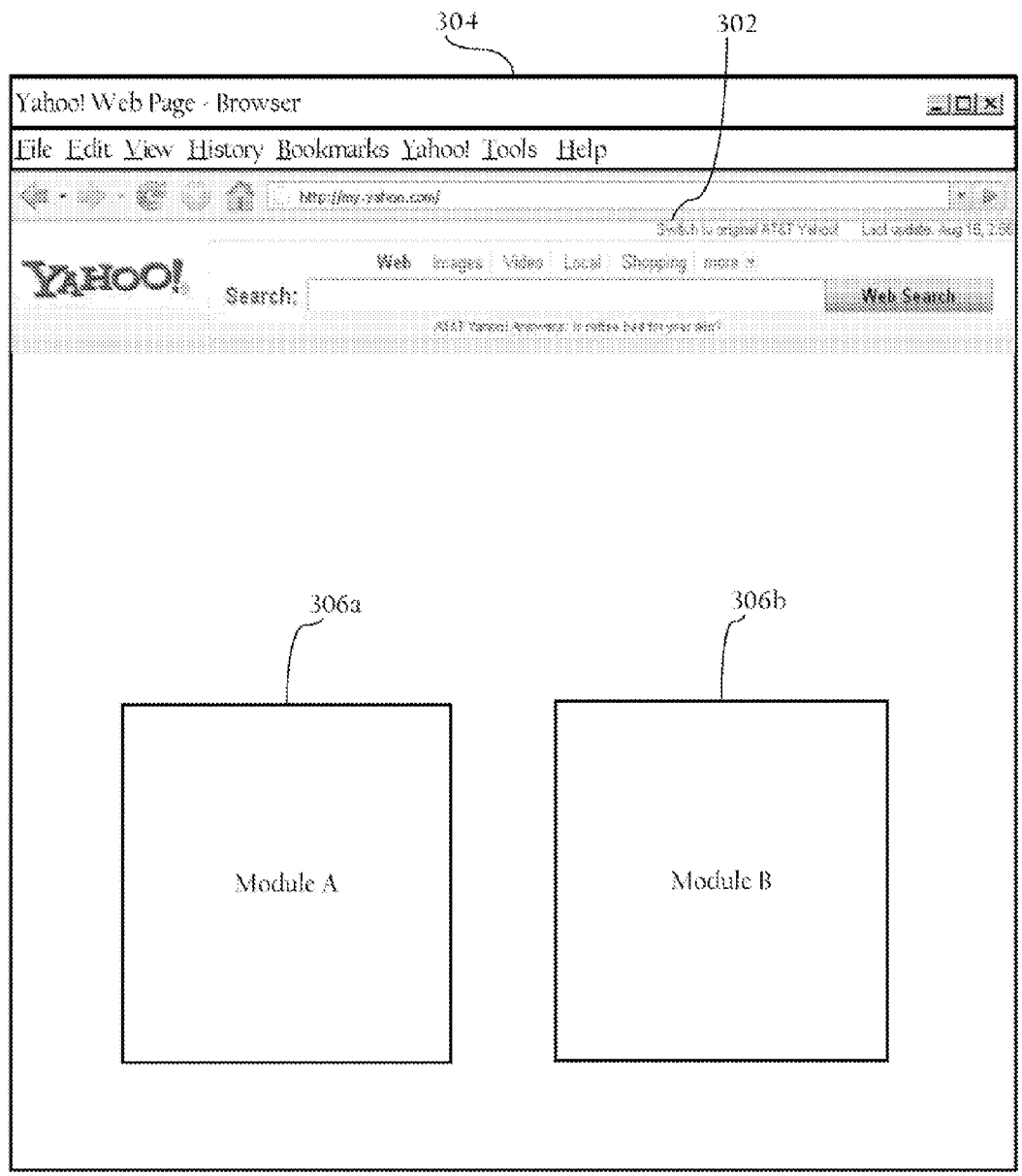
FIG. 3 is an example graphical user interface.

FIG. 3 illustrates an example base web page 302 rendered within a browser window 304. The base web page 302 includes two module windows 306a, 306b embedded in base web page 302 as iframes. FIG. 4 illustrates a subset of the HTML code (including some pseudocode) of the base web page 302 that a browser client processes to render base web page 302 within the browser window 304. The HTML code of base web page 302 includes a first iframe element 402 and a second iframe element 404. The "src" element causes the browser client to load in the content corresponding to the uniform resource locator (URL) within the context of the iframe. In one implementation, service provider site 30 serves modules within the iframe elements 402, 404 from origins that differ from the origin of base web page 302. For descriptive purposes, the disclosure refers to such iframes 402, 404 as module iframes. These iframes are child elements of the base web page 302. For example, the content corresponding to a first module (labeled Module A, for didactic purposes) could be served from a host named modulehost1.com, while a second module could be served from a host named modulehost2.com. As FIG. 3 illustrates, base web page 302 is served from a host associated with http://my.yahoo.com/. As FIG. 4 illustrates, the HTML code of base web page 302 further includes a module connector script element 406 (named "conduit" for didactic purposes). In the implementation shown, the module connector script is a Javascript object, which is loaded into the page. The script element 406 also includes iframe token (iFtoken) to module identifier (moduleId) mapping information 408. As FIG. 4 illustrates, the iframe elements 402, 404 include identifiers (id) that identify a module (e.g., module_A, module_B), while the location (src) string includes a token (token) parameter identifying a token value (iFtokenA, iFtokenB, etc.) corresponding to a given module. The mapping information 408 maps these tokens to corresponding module identifiers. The module connector script can use these mappings to ensure that a module executing in one iframe can not pretend to be another module. For example, messages passed to the module connector script may include tokens, which the module connector script can use to validate the message against the identifier (id) of the module iframe and the token to module mapping information 408. In one implementation, the module connector script uses the tokens to identify modules and message queues to which messages should be added. Other implementations are possible. For example, one or more of the modules need not be visibly rendered in browser window 304.

FIG. 5 illustrates example HTML code (including some pseudocode to represent module interconnection and other functions) of an HTML document corresponding to "Module A." The illustrated code is purely for didactic purposes. A similar document could be loaded in for Module B with the same or similar structure and commands. As discussed in more detail below, the modules may register as senders and listeners. FIG. 5 shows that the HTML code includes a script element 502 that causes a messenger script object to be loaded within the module iframe. The data locator for the messenger script also includes the token (iFtokenA), which is received by service provider site 30 and included with the messenger script to allow it to embed the token in a messenger iframe element as discussed below. Among other things, the messenger script, when loaded and executed, is operative to embed another iframe (referred to herein as a "messenger iframe") within the module iframe. In one implementation, the messenger script accesses the object model of the HTML document of the module iframe and adds HTML code to create the messenger iframe at runtime. The messenger iframe is a child element of the module iframe. The messenger iframe, in one implementation, is not visible or rendered within browser window 304. The following provides example code for purposes of illustration.

```
<iframe src=http://my.yahoo.com/messenger?token=iFtokenA#[{... ... ...},
{... ... ...},{... ... ...},{... ... ...},{... ... ...}]>
    top.conduit.register(window, token);
</iframe>
```

Since the origin indicated in the src attribute of the messenger iframe element is the same origin as the base web page 302, objects of the base web page 302 can interact with the content of the messenger iframe. Content of the module iframe, however, cannot interface with content of the base web page 302 or the messenger iframe. The src attribute of the messenger iframe element also includes the token value (here, iFtokenA). As the foregoing illustrates, the messenger script also includes code that causes the messenger script to register the messenger iframe with the module connector script of base web page 302 ((top.conduit.register(window, token)). The module connector script can use the token passed to it and the module identifier to token mapping information 408 to identify the module iframe (by accessing the id attribute of the module iframe) to which the messenger script and messenger iframe correspond. The module connector script may also validate the registration message by accessing the iframe and messenger iframe elements and comparing them against its mapping information 408. Furthermore, the module connector script can use the token values to identify the messenger iframe message queue to which various messages should be added. The src URL of the messenger iframe element also includes an encoded string (after #) that operates as a message queue. Changes in the string value after the hash (#) does not cause the browser client to send a new request. In a particular implementation, the encoded string uses JavaScript Object Notation (JSON) to implement the message queue, where each message is delimited using the JSON syntax. According to the domain security model of most browser clients, the messenger script may initially set the location (src) of the messenger iframe element, and also to reset this location after the messenger iframe has been created. Further, given that the location (src) of the messenger iframe element is set to the same origin as the base web page 302, the module connector script may access the location (src) and the encoded string to determine what messages are in the message queue. The module connector script is also able to modify the message queue to add new messages and delete expired ones. Still further, the messenger script, even though it operates within the context of the module iframe, is still able to read and modify the location (src) attribute. In other implementations, the module connector script may also be embedded in an iframe. In such an implementation, the messenger script would create messenger iframe elements that identified the same origin as the origin of the module connector script (if different from the base web page 302). As discussed in below, the messenger iframe element may be dynamically created in response to a first message sent by a module.

Still further, the messenger script may also declare a messaging application programming interface (API) to allow modules to register as senders and receivers, and to send and receive messages. The messaging API is also a published specification available to third party module developers. The messaging API allows module developers to create modules that can register with the module connector script, as well as send and receive messages from other modules. In the example code of FIG. 5, for instance, the module includes a loadPhotosFromFlickr function that accesses the site flickr.com to obtain URLs to one or more photos uploaded to the user's account. The advertisePhotos function uses the interface declared by the messenger script to send messages. In the implementation shown, the function includes a send command 504, according to the messaging API, that causes the messenger script to post the photo URLs in the message queue of the location (src) attribute of the corresponding messenger iframe (see below). In a particular implementation, the module connector script supports a plurality of channels. Each message identifies a channel and includes corresponding data to be sent on the channel. As FIG. 5 illustrates, the send command 502 identifies a channel called "pictures." Each channel is also associated with an output format that a listening module can expect. Additional channels could include text, pictures, music, video, etc. For example, the pictures channel may require that the output be URLs to photos, while the video channel may require the output to be URLs to videos. In one implementation, a module can also register as a listener on one or more channels by issuing a send command on a "listener" channel. For example, according to one possible messaging API, a module developer may create a module that calls a receive function, having the following API: receive("pictures", handler), and defines a handler (e.g., handler=function(msg)). The underlying messaging implementation may perform a send operation (such as send({channel:"listener", data:"pictures"})) to advertise the module's ability to listen to a particular channel. The messaging implementation stores pointers to the handlers for future reference, so that when a message on that channel is received, it can be routed to the handler function. In this manner, the module, relying on the receive messaging API issues a send command on the listener channel identifying the channel(s) on which it can receive messages. The receive function further identifies a handler for received messages, handler defines a function that processes the message. For example, if the message is a URL to a photo, the handler function may define a process that retrieves the photo and adds it to a slideshow that is displayed to the user.

B.1. Messenger Script—Send

Figure 6:
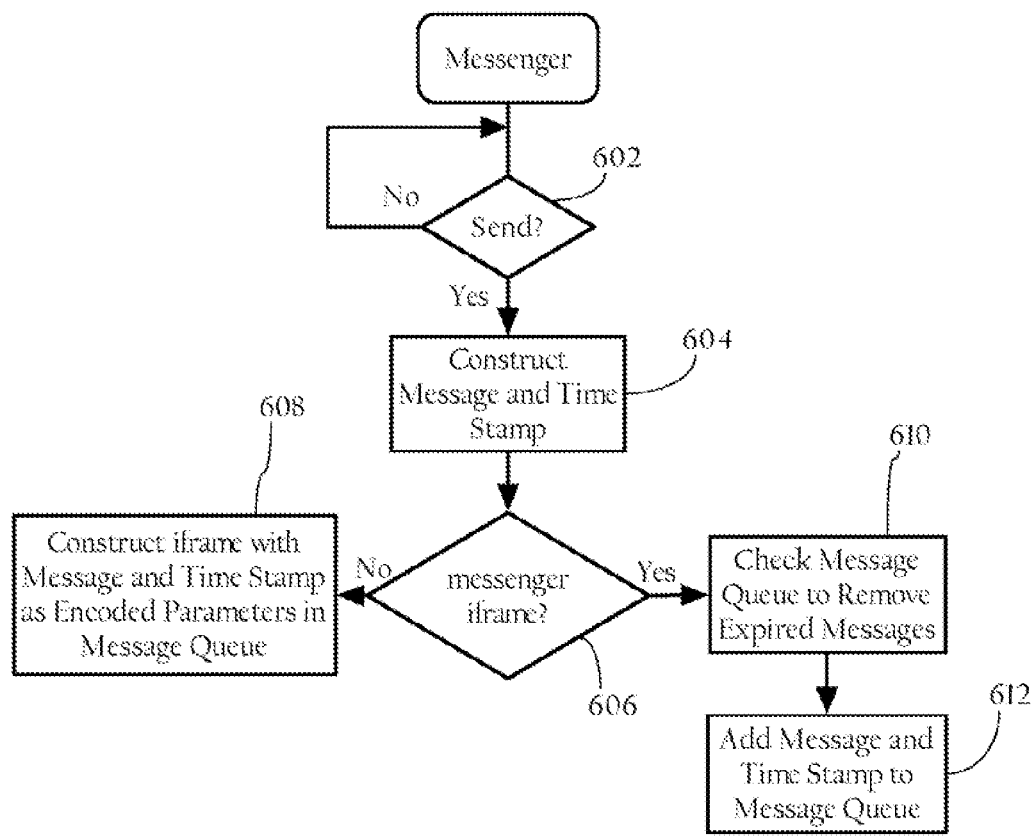

FIG. 6 illustrates a method that may be implemented by a messenger script according to one implementation of the invention to send messages from a module. The messenger script listens for send commands (602) issued from a module operating within the context of the module iframe. Responsive to a send command, the messenger script constructs a message based on the parameter information passed to it and creates a time stamp (604). If the messenger iframe has not yet been created (606), the messenger script creates the messenger iframe element within the module iframe, adding the message and time stamp to the message queue as encoded parameters to the location (src) attribute (see above) (608). If the messenger iframe is already created, the messenger script checks the message queue to remove expired messages, based on the time stamp (610), and adds the new message and time stamp to the message queue (612). The messages added to the location (src) attribute of the messenger iframe are then available to be accessed and read by the module connector script.

B.2. Module Connector Script

Figure 7:
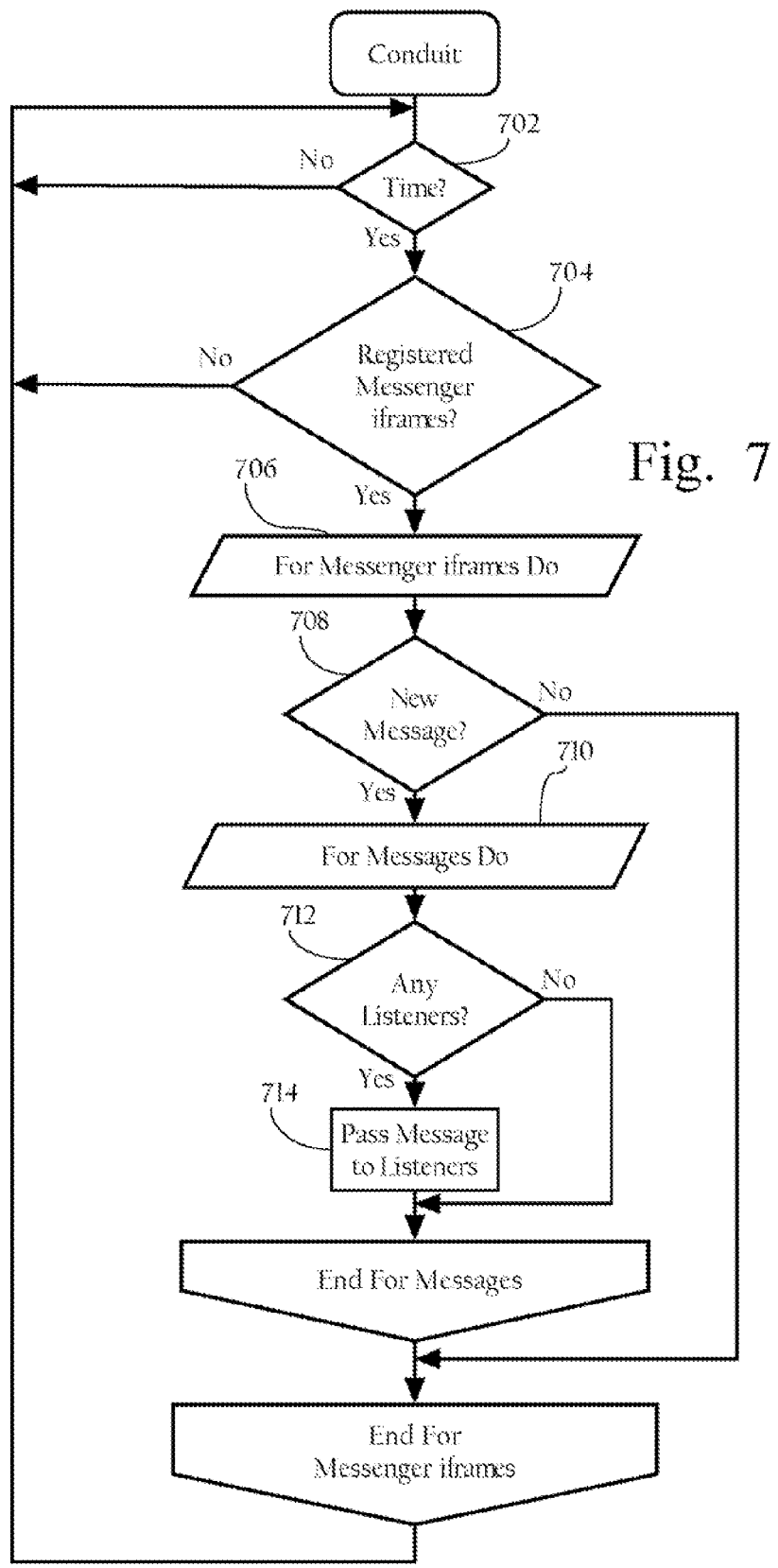

FIG. 7 sets forth a method implemented by a module connector script according to one possible implementation of the invention. The process flow illustrated in FIG. 7 may be initiated in response to the registration of a first messenger iframe (see above). As FIG. 7 illustrates, the message connector script operates on a periodic basis (702), such as every 20 milliseconds, to check for any registered messenger iframes (704). If any messenger iframes have been registered, the message connector script, for all registered messenger iframes (706), determines whether any new messages have been added to the message queue (708). If so, the message connector script, for all new messages (710), passes the message to any listeners of the channel indicated in the respective message (712, 714).

FIG. 8 illustrates a process, implemented by a module connector script according to one possible implementation of the invention, directed to passing a message to a listener module. As FIG. 8 illustrates, the message connector script accesses the location (src) attribute of the messenger iframe corresponding to the listener module (802), and decodes the parameter information of the message queue (804). Using the time stamps of each message in the message queue, the message connector script expires old messages from the message queue by deleting them (806), and adds a new message to the message queue (808). In this manner, the message is accessible to the messenger script operating within the context of the module iframe of the corresponding listener module.

Other implementations are possible. For example, operation of the message connector script could be adjusted by the end-user, who may configured one or more rules that define the modules with which a given module can interact, or the channels on which a module can receive messages. Still further, the time interval at which the module connector script operates can be a fixed value, or can gradually increase at each operation.

B.3. Messenger Script—Listen

FIG. 9 illustrates a method that may be implemented by a messenger script according to one implementation of the invention to listen for messages and provide them to a module. As FIG. 9 illustrates, the messenger script executes a listening process that operates on a periodic basis (902). After a given time interval, the messenger script decodes the location (src) attribute of the messenger iframe to check for messages in the message queue (904), and passes any new messages to the handler registered to receive the message (see above) (906). In this manner, a module can receive one or more messages and process them to, for example, generate output that is rendered within browser window 304. In addition, the structured mechanism for inter-module communication allows modules to interact, while still preserving security since the modules have only the means disclosed herein to communicate and interact with other page objects.

The present invention has been explained with reference to specific embodiments. For example, while embodiments of the present invention have been described as operating in connection with HTTP, HTML and JavaScript, the present invention can be used in connection with any suitable protocol environment. Other embodiments will be evident to those of ordinary skill in the art. It is therefore not intended that the present invention be limited, except as indicated by the appended claims.

What is claimed is:

1. A method comprising:
   receiving, by a processor, at a first origin, a request for a web page from a user agent, wherein the user agent implements a domain security model disallowing interaction between content from different origins across inline frames comprised within the web page;
   identifying, by the processor, a plurality of module objects to add to a base document of the web page;
   generating, by the processor, the base document including the module objects, each module object comprising a respective module inline frame element, each of the module inline frame elements cause the user agent to load a respective module document from an origin different from the first origin;
   including, by the processor, within the base document, a module connector element comprising respective tokens identifying each of the module objects, the module connector element enabling exchange of messages between the module objects comprised in the base document via the tokens, enabling exchange of messages comprising including within the respective module document a messenger object and one or more of the identified module objects, each messenger object is configured to register with the module connector element and facilitates the module objects included within the respective module document to transmit and receive the messages; and
   transmitting, by the processor from the first origin, the web page to the user agent.

2. The method of claim 1, causing, by the processor, the messenger object to create, within a corresponding module inline frame, a messenger inline frame element including a location attribute identifying the first origin.

3. The method of claim 2, further comprising:
   adding, by the processor, a message sent by one of the identified module objects to the location attribute of the messenger inline frame element; and
   providing, by the processor, a new message detected in the location attribute of the messenger in line frame element to one of the identified module objects based on an identifying token included within the new message.

4. The method of claim 1, configuring, by the processor, the messenger object to define a messaging application programming interface to the module object.

5. The method of claim 1, configuring, by the processor, the messenger object to expire messages previously added to the location attribute of the messenger inline frame element.

6. The method of claim 1, configuring, by the processor, the module connector object to expire messages previously added to the location attribute of the messenger inline frame element.

7. The method of claim 1 wherein the module connector object is further configured by the processor to register as a listener on a channel and to selectively add the new message to the one or more location attributes of corresponding messenger inline frame elements depending on a channel of the new message and registered listeners on the channel.

8. The method of claim 1 wherein the first origin is defined relative to a combination of a host name, port and protocol.

9. The method of claim 1 wherein the request identifies a user, and wherein the layout information is accessed from a user account associated with the user.

10. An apparatus comprising:
    a network interface;
    a memory;
    one or more processors; and
    network application program logic, comprising one or more processor-executable instructions for:
    receiving, at a first origin, a request for a web page from a user agent, wherein the user agent implements a domain security model disallowing interaction between content from different origins across inline frames comprised within the web page;
    identifying, a plurality of module objects to add to a base document of the web page;
    generating, the base document including the module objects, each module object comprising a respective module inline frame element, each of the module inline frame elements cause the user agent to load a respective module document from an origin different from the first origin, wherein the base document further comprises a module connector element comprising respective tokens identifying each of the module objects, the module connector element enabling exchange of messages between the module objects comprised in the base document via the tokens, enabling exchange of messages comprising including within the respective module document a messenger object and one or more of the identified module objects, each messenger object is configured to register with the module connector element and facilitates the module objects included within the respective module document to transmit and receive the messages; and transmitting, from the first origin, the web page to the user agent.

11. The apparatus of claim 10, the module inline frame element further comprises, a messenger inline frame element including a location attribute identifying the first origin.

12. The apparatus of claim 11, further comprising:
a message sent by one of the identified module objects at the location attribute of the messenger inline frame element; and
a new message received by one of the module objects included in the module document at the location attribute of the messenger in line frame element.

13. The apparatus of claim 12, the new message comprises a token identifying the receiving one of the module objects.

14. The apparatus of claim 11, the location attribute of the messenger in line frame element comprises an encoded string and an identifying token, the encoded string operates as a message queue for one of the module objects included in the module document and identified by the identifying token.

15. The apparatus of claim 10, wherein the first origin is defined relative to a combination of a host name, port and protocol.

16. A non-transitory computer readable storage medium, having stored thereon, processor-executable instructions for:
receiving, at a first origin, a request for a web page from a user agent, wherein the user agent implements a domain security model disallowing interaction between content from different origins across inline frames comprised within the web page;
identifying a plurality of module objects to add to a base document of the web page;
generating the base document including the module objects, each module object comprising a respective module inline frame element, each of the module inline frame elements cause the user agent to load a respective module document from an origin different from the first origin;
including, within the base document, a module connector element comprising respective tokens identifying each of the module objects, the module connector element enabling exchange of messages between the module objects comprised in the base document via the tokens, enabling exchange of messages comprising including within the respective module document a messenger object and one or more of the identified module objects, each messenger object is configured to register with the module connector element and facilitates the module objects included within the respective module document to transmit and receive the messages; and
transmitting from the first origin, the web page to the user agent.

\* \* \* \* \*